United States Patent [19]
Betts et al.

[11] 4,123,586
[45] Oct. 31, 1978

[54] FLAME-RESISTANT COMPOSITION, AND ELECTRICAL PRODUCT THEREOF

[75] Inventors: Joseph E. Betts, Westport, Conn.; Fred F. Holub, Schenectady, N.Y.

[73] Assignee: General Electric Company, New York, N.Y.

[21] Appl. No.: 816,857

[22] Filed: Jul. 18, 1977

Related U.S. Application Data

[63] Continuation-in-part of Ser. No. 554,471, Mar. 3, 1975, abandoned.

[51] Int. Cl.² ........................ D02G 3/00; B32B 25/20
[52] U.S. Cl. ..................................... 428/391; 252/8.1; 260/42.42; 260/45.75 B; 428/447; 428/469; 428/539; 428/921; 428/375
[58] Field of Search ............... 428/447, 920, 539, 469, 428/375, 921; 252/8.1; 260/42.42, 41, 45.75 B, 45.75 V, 46.5 G

[56] References Cited

U.S. PATENT DOCUMENTS

| | | | |
|---|---|---|---|
| 2,484,595 | 10/1949 | Sprung | 260/46.5 G |
| 2,928,801 | 3/1960 | Safford et al. | 260/41 |
| 3,640,949 | 2/1972 | Dalzell | 252/8.1 |
| 3,860,676 | 1/1975 | Krackeler et al. | 260/45.75 B |
| 3,900,681 | 8/1975 | Walters | 428/447 |
| 3,957,719 | 5/1976 | MacKenzie | 260/42.42 |
| 4,022,945 | 5/1977 | MacKenzie | 252/8.1 |

*Primary Examiner*—George F. Lesmes
*Assistant Examiner*—E. Rollins Buffalow
*Attorney, Agent, or Firm*—R. G. Simkins; P. L. Schlamp

[57] ABSTRACT

Flame-resistant composition comprising a cross-linked polyolefin, decabromodiphenyl ether, silicone gum and dibasic lead phthalate, and electrical conductors insulated therewith.

7 Claims, 1 Drawing Figure

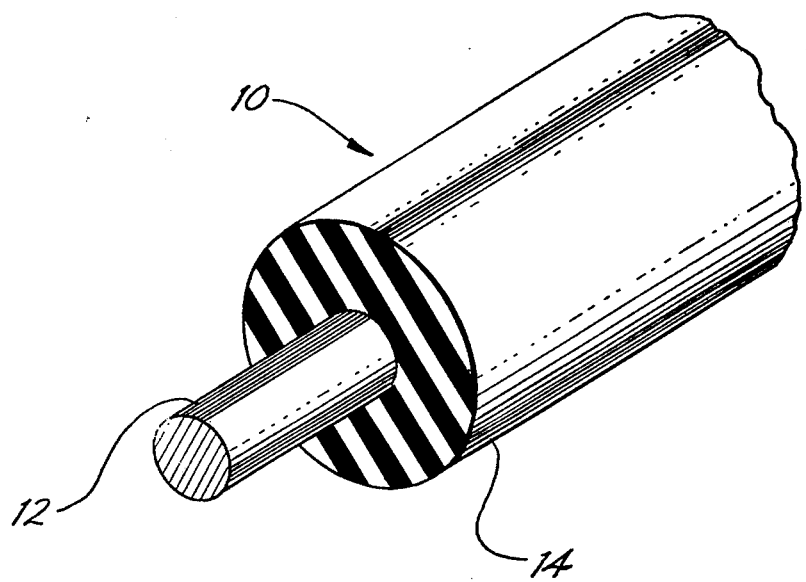

FLAME-RESISTANT COMPOSITION, AND ELECTRICAL PRODUCT THEREOF

This application is a continuation-in-part of our previously filed application for patent Ser. No. 554,471, filed Mar. 3, 1975, of the same title and now abandoned.

BACKGROUND OF THE INVENTION

The increased use of polymeric compositions, such as polyolefins, in many and diverse applications or products, and the combustibility of such polymeric materials, has greatly stimulated the investigation of flameproofing measures for polymeric compositions. Moreover, the high costs of fire damage in lives and property, and the imposition of increasingly stringent safety regulations, have recently significantly intensified the pursuit of more effective or practical means of controlling or inhibiting combustion and the propagation thereof in many products and materials.

Notwithstanding prior developments of a great number of flameproofing measures or additives resulting from this expanding effort, there remains a continuing need for improvements to meet current or new requirements in this area.

SUMMARY OF THE INVENTION

This invention comprises the discovery of the improved resistance to flame or combustion, and the propagation thereof, and other advantages attributable to the combination of decabromodiphenyl ether, silicone gum and dibasic lead phthlate with cross-liked polyolefins, such as polyethylene, and other ingredients. The invention thus relates to flame-resistant polyolefin compounds, and it has particular utility in flame-proofing electrical insulations comprising ethylenecontaining polymer compounds which have been cross-link cured.

OBJECTS OF THE INVENTION

It is a primary object of this invention to provide polyolefin compounds of improved resistance to flame and combustion, and deformation and flow at high or flame temperatures.

It is also an object of this invention to provide polyolefin compounds having improved electrical and physical properties, as well as resistance to flame and combustion.

It is a further object of this invention to provide an electrical conductor comprising a metallic conductive element having an insulation thereabout of a cross-linked polyolefin compound which is highly resistant to flame and combustion and has superior electrical and physical properties.

BRIEF DESCRIPTION OF THE DRAWING

The Figure comprises a perspective view of an insulated conductor comprising a metallic element having a cross-linked polyolefin insulation thereabout.

DESCRIPTION OF A PREFERRED EMBODIMENT

In accordance with this invention, a cured polymeric compound having a high level of resistance to flame and combustion, and deformation and flow at high or flame temperatures, among other improved and advantageous attributes, is provided with a polyolefin composition comprising cross-linked ethylene-containing polymers by combining therewith decabromodiphenyl ether, silicon gum and dibasic lead phthlate.

The polyolefin compositions of this invention comprise ethylene-containing polymers such as polyethylene, copolymers of ethylene and other polymerizable materials, and blends of such polymers including copolymers. Typical copolymers of ethylene and other polymerizable materials include, for example, ethylene-propylene copolymers and ethylene-propylene diene terpolymers, ethylene-vinyl acetate, ethylene alkylacrylate copolymers, and ethylene-butene copolymers.

The flame-resistant, cross-link cured polyolefin compound products of this invention can comprise fillers, pigments, curing coagents, and other conventional additives including preservatives such as antioxidants, modifying agents, mold release ingredients, processing aids or lubricants such as lead or zinc stearates in minuscule amounts of about 1 to 5 parts by weight, and the like which are commonly compounded with polyolefins, in addition to the essential ingredients or basic components thereof set forth hereinafter, such as the decabromodiphenyl ether, silicone gum and dibasic lead phthlate.

The invention applies to and includes all of the above-referred polyolefins when cross-link cured and thermoset by a heat-activated peroxide cross-linking agent such as disclosed in U.S. Pat. Nos. 2,888,424; 3,079,370; 3,086,966 and 3,214,422, or by irradiation. Suitable peroxide cross-link curing agents comprise organic tertiary peroxides characterized by at least one unit of the structure:

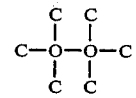

which decomposes at a temperature above about 295° F. and thereby provide free radicals. Peroxide curing agents can be used in amounts of about 2 to 8 parts by weight per 100 parts of the polymer. A preferred peroxide is a di-α-cumyl peroxide, and other apt peroxides comprise the tertiary diperoxides such as 2,5-dimethyl-2,5-di (t-butyl peroxy) hexane and 2,5-dimethyl-2,5-di(t-butyl peroxy) hexyne-3, and the like diperoxy and polyperoxide compounds. Also a curing coagent such as triallyl cyanurate is preferably employed in amounts of up to about 5 parts by weight per 100 parts of the polymer. Radiation cross-link curing can be produced by high energy electrons, X-ray and the like sources of irradiation.

The organopolysiloxane gum or eleastomer of this invention, for use in combination with the polyolefin, decabromobiphenyl ether, and lead compound, among other ingredients, comprises gums or organopolysiloxanes which have been condensed to a high molecular weight polymer of a gummy elastic, substantially semi-solid state. For example a typical silicone elastomer for use in the composition of this invention is a class of dimethylpolysiloxanes having the chemical structure:

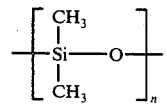

Another class of silicone elastomers for use in this invention is the methyl-phenyl polysiloxanes. Further examples of the type of silicone elastomer gums usable in obtaining the compositions of this invention comprise the organopolysiloxanes referred to in U.S. Pat. Nos. 2,888,424 and 2,888,419, and identified in detail in U.S. Pat. Nos. 2,448,556; 2,448,756; 2,457,688; 2,484,595; 2,490,357; 2,521,528; 2,541,137; 3,098,836; and 3,341,489. Such high molecular weight siloxane polymers normally have Brookfield viscosities of in excess of about 100,000 centipoise at 25° C.

The lead component comprises dibasic lead phthlate, or equivalent lead compounds.

The fumed silica comprises a form of silica described in U.S. Pat. No. 2,888,424, and a type which is sold under the trade designation of Cabosil MS7 of Godfrey L. Cabot, Inc., of Boston, Massachusetts.

The combination of decabromodiphenyl ether, silicone gum and dibasic lead phthlate and other ingredients of this invention can be mixed and combined with a polyolefin component by means of any conventional compounds method or apparatus, such as working in a Banbury mixer or on a two roll rubber mill. Preferably the ingredients of the compound formulation, except those which are sensitive to the relative moderate mixing temperatures of about 300° F. to about 400° F., such as a heat decomposable peroxide curing agent, are combined and initially admixed together or substantially uniformly dispersed with each other at a temperature sufficient to soften and plasticize the particular polyolefin ingredient. Following the attainment of substantial uniformity of the admixed ingredients, the temperature of the admixed batch is reduced below the decomposition level of the particular peroxide curing agent, or other heat sensitive ingredient, and the curing agent or any other sensitive ingredient is then introduced and dispersed preferably uniformly in the mix.

The proportions of the flame-proofing combination of decabromodiphenyl ether, silicone gum, dibasic lead phthalate and the like ingredients admixed with the polyolefin compounds depend, of course, upon the desired or required degree of resistance to flame and combustion, and the content of polymeric or other combustible materials in the overall compound. Suitable amounts for effective flame resistance in polyolefins comprise about 15 to about 50 parts by weight of the decabromodiphenyl ether, about 3 to about 10 parts by weight of the silicone gum, and about 3 to about 10 parts by weight of the dibasic lead phthlate, per 100 parts by weight of the organic polymer content of the compound. However, greater or smaller quantities can suffice for particular applications.

In accordance with this invention, the level of resistance to flame and deformation or flow at high or flame temperatures provided by the combination of decabromodiphenyl ether, silicone gum and lead, and other ingredients of this invention within a polyolefin compound can be enhanced by the inclusion of an oxide of antimony, such as antimony trioxide, in the compound. Suitable amounts of such oxides of antimony include about 5 to about 25 parts by weight per 100 parts by weight of the polyolefin polymer.

Typical formulations for the practice of this invention comprise, in approximate relative parts by weight, the following combinations of essential and preferred ingredients.

| Ingredient | Parts by Weight |
|---|---|
| Polyolefin | 100 |
| Decabromodiphenyl ether | 15–50 |
| Silicone gum | 3–10 |
| Dibasic lead phthalate | 3–10 |
| Antimony oxide | 5–25 |
| Fumed silica | 3–10 |
| Clay | 0–25 |
| Antioxidants | 1–10 |
| Processing aid or molding lubricant | 0–5 |
| Curing coagent | 0–3 |
| Organic peroxide curing agent | 2–5 |

The following comprise examples of the novel and improved flame resistant polyolefin composition of this invention, with the ingredients given in relative parts by weight.

The test specimens for each example were compounded in a typical manner, comprising combining all ingredients, except the peroxide curing agent, at a temperature of about 100° C. + 5° C. for about 5 minutes, then adding and blending in the peroxide for another 5 minutes at the same temperature, and curing the sample specimens thereof at 177° C. for 30 minutes in a press. The composition of the specific formulation given in the above mentioned example exhibited the properties set forth below:

| INGREDIENTS Parts By Weight | EXAMPLES I | II |
|---|---|---|
| Polyethylene | 100 | 100 |
| Decabromodiphenyl ether | 40 | 25 |
| Silicone gum | 6.25 | 5 |
| Dibasic lead phthalate | 5 | 5 |
| Antimony oxide | 14 | 10 |
| Fumed silica | 5 | 5 |
| Clay | — | 15 |
| Antioxidants | | |
| Polymerized trimethyl dihydroquinoline, Agerite MA | 1.5 | — |
| 4,4'-thiobis-(6-tert-butyl-m-cresol), Santowhite Crystals | 0.25 | — |
|  | 0.25 | — |
| Thioester bis hindered-phenol, Irganox 1035 | — | 3 |
| Thio dipropionate polyester, Poly TDP 2000 | — | 3 |
| Processing aid | | |
| Lead stearate | — | 1 |
| Vinyl silane | — | 1.25 |
| Curing coagent-triallyl cyanurate | 1 | 1 |
| Peroxide curing agent-dicumy peroxide | 2.5 | 2.5 |
| PROPERTIES | EXAMPLES I | II |
| Oxygen Index Value | 28.4 | 27.2 |
| UL-44 FR-1 Flame Test | passed | passed |
| Original Tensile Strength, psi | 2460 | 2233 |
| Original Elongation, percent | 400 | 376 |
| Heat Treated 7 Day at 150° C | | |
| Percent Retention - Tensile, psi | 88 | 99 |
| Percent Retention - Elongation | 91 | 90 |
| Heat Treated 30 Days at 136° C | | |
| Percent Retention - Tensile, psi | 89 | 92 |
| Percent Retention - Elongation | 88 | 80 |
| Heat Treated 60 Days at 136° C | | |
| Percent Retention - Tensile, psi | 89 | 99 |
| Percent Retention - Elongation | 82 | 82 |
| Heat Treated 90 Days at 136° C | | |
| Percent Retention - Tensile, psi | 55 | 60 |
| Percent Retention - Elongation | 34 | 19 |

The flame resisting properties of the examples of the compositions of this invention were all identically evaluated by the Oxygen Index Test (ASTM D-2863-7-) which designates the fraction of oxygen by volume in nitrogen required to just maintain flaming of the material of the test sample. Thus, the higher the oxygen index for a composition, the better its resistance to combustion and flame.

Referring to the drawing, there is shown a typical construction for an insulated electrical wire or cable product 10*, comprising a metallic conductive element 12* and an overlying body of cured polymeric insulation 14* extending thereabout or covering the conductor. In the drawing, the product 10* is illustrated as a short section with the insulation 14* removed from the end portion of the conductor 12*. According to one embodiment of this invention, the novel flame-resistant polyolefin thereof can be used to provide or form the insulation 14* on conductive element 12* of wire or cable product 10*. It is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. An electrical conductor comprising a metallic conductive element having a flame-resistant, cross-link cured polyolefin insulation thereabout consisting essentially of the following, in the approximate relative parts by weight of:

| | |
|---|---|
| Polyolefin | 100 |
| Decabromodiphenyl ether | 15 – 50 |
| Silicone gum | 3 – 10 |
| Organic lead salt | 3 – 10 |
| Antimony oxide | 5 – 25 |
| Fumed silica | 3 – 10 |

2. The electrical conductor of claim 1, wherein the polyolefin is cross-link cured with a peroxide curing agent.

3. The electrical conductor of claim 1, wherein the polyolefin comprises at least one ethylene-containing polymer selected from the group consisting of polyethylene, copolymers of ethylene and other polymerizable materials, and blends of such polymers.

4. An electrical conductor comprising a metallic conductive element having a flame-resistant, cross-link cured polyolefin insulation thereabout consisting essentially of the following, in approximate relative parts by weight of:

| | |
|---|---|
| Polyethylene | 100 |
| Decabromodiphenyl ether | 40 |
| Silicone gum | 6.25 |
| Dibasic lead phthlate | 5 |
| Antimony oxide | 14 |
| Fumed silica | 5 |
| Antioxidant | 1.75 |
| Triallyl cyanurate curing coagent | 1 |
| Organic tertiary peroxide curing agent | 2.5 |

5. The electrical conductor of claim 4, wherein the antioxidant comprises about 1.5 parts by weight of polymerized trimethyl dihydroquinoline and about 0.25 parts by weight of 4,4'-thiobis-(6 tert-butyl-m-cresol).

6. An electrical conductor comprising a metallic conductive element having a flame-resistant, cross-link cured polyolefin insulation thereabout consisting essentially of the following, in approximate relative parts by weight of:

| | |
|---|---|
| Polyethylene | 100 |
| Decabromodiphenyl ether | 25 |
| Silicone gum | 5 |
| Dibasic lead phthlate | 5 |
| Antimony oxide | 10 |
| Fumed silica | 5 |
| Clay | 15 |
| Antioxidant | 6 |
| Vinyl silane | 1.25 |
| Triallyl cyanurate curing coagent | 1 |
| Organic tertiary peroxide curing agent | 2.5 |

7. The electrical conductor of claim 6, wherein the antioxidant comprises about 3 parts by weight of thioester bis hindered - phemol and about 3 parts by weight of thio dipropionate polyester.

* * * * *